United States Patent [19]

Wall et al.

[11] Patent Number: 5,005,644
[45] Date of Patent: Apr. 9, 1991

[54] STEAM ENHANCED OIL RECOVERY METHOD USING BRANCHED ALKYL AROMATIC SULFONATES

[75] Inventors: Robert G. Wall, Pinole; Francois Friedmann, Laguna Beach; Steven P. Current, Novato, all of Calif.

[73] Assignee: Chevron Research Company, San Francisco, Calif.

[21] Appl. No.: 418,016

[22] Filed: Oct. 6, 1989

Related U.S. Application Data

[63] Continuation of Ser. No. 338,397, Apr. 6, 1989, abandoned, which is a continuation of Ser. No. 55,148, May 28, 1987, abandoned.

[51] Int. Cl.⁵ .................. E21B 43/22; E21B 43/24
[52] U.S. Cl. .................. 166/272; 166/273; 166/294; 166/309; 252/8.554
[58] Field of Search .......... 166/272, 273, 274, 275, 166/294, 303, 309; 252/8.554

[56] References Cited

U.S. PATENT DOCUMENTS

| | | | |
|---|---|---|---|
| 3,885,626 | 5/1975 | Gale et al. | 166/273 |
| 4,086,964 | 5/1978 | Dilgren et al. | 166/272 |
| 4,161,217 | 7/1979 | Dilgren et al. | 166/272 |
| 4,393,937 | 7/1983 | Dilgren et al. | 166/272 |
| 4,445,573 | 5/1984 | McCaleb | 166/294 X |
| 4,468,335 | 8/1984 | Chen et al. | 166/274 X |
| 4,532,993 | 8/1985 | Dilgren et al. | 166/303 |
| 4,556,107 | 12/1985 | Duerksen et al. | 166/272 |
| 4,565,647 | 1/1986 | Llenado | 252/354 |
| 4,576,232 | 3/1986 | Duerksen et al. | 166/273 |
| 4,607,700 | 8/1986 | Duerksen et al. | 166/303 |
| 4,609,044 | 9/1986 | Lau | 166/272 X |
| 4,643,256 | 2/1987 | Dilgren et al. | 166/309 |
| 4,743,335 | 5/1988 | Angstadt et al. | 252/8.554 |
| 4,769,161 | 9/1988 | Angstadt | 166/272 X |
| 4,828,032 | 5/1989 | Teletzke et al. | 166/272 |

FOREIGN PATENT DOCUMENTS

| | | |
|---|---|---|
| 0158486 | 4/1984 | European Pat. Off. . |
| 3510765A1 | 3/1984 | Fed. Rep. of Germany . |
| 2557198 | 12/1983 | France . |
| 2156400 | 3/1964 | United Kingdom . |

OTHER PUBLICATIONS

Angstadt et al. CA 103: 2/8070q (FR 2,557,198), 1985.
Angstadt, CA 104:21751b (EP 158,486), 1985.
Janssen Van Rosmalen CA 104:8120q (DE 3,510,765), 1985 (also in *Oilfield Chemicals*, Jan. 1986, p. 9).

Primary Examiner—George A. Suchfield
Attorney, Agent, or Firm—Burns, Doane, Swecker & Mathis

[57] ABSTRACT

A method of enhanced oil recovery using foam to improve the effectiveness of steam to mobilize viscous crude, either for steam stimulation in a single well or for steam drive between wells. A new surfactant composition having branched alkyl aromatic sulfonates as the effective agent for the steam foamer is used because of its ability to foam in the presence of substantial pore volumes of residual oil and thereby mobilize significant amounts of producible oil by diverting steam to less-permeable zones.

34 Claims, 3 Drawing Sheets

Fig. 3

STEAM ENHANCED OIL RECOVERY METHOD USING BRANCHED ALKYL AROMATIC SULFONATES

RELATED APPLICATION

This application is a continuation of Ser. No. 07/338,397 filed Apr. 6, 1989, now abandoned, which is a continuation of Ser. No. 07/055,148, filed May 28, 1987, now abandoned.

FIELD OF THE INVENTION

The present invention relates to enhanced oil recovery from a petroleum-bearing formation. More particularly, it relates to an improved method of steam or gas stimulation, or drive, of petroleum from such a formation wherein a foam-forming surfactant is injected into a well along with the steam or gas.

It has been postulated that steam or gas and surfactant coact with formation fluids to form foam which tends to block highly permeable gas, or steam, channels that may cause "fingering" or "gravity override", of the steam or gas through the formation. In a mature steam drive, residual oil saturations ($S_{or}$) are frequently less than 15% in the highly permeable steam override zones or isolated channels. In these circumstances, it is desirable to divert the steam from the high permeability channels at low oil saturation into the less permeable zones at high oil saturation levels. The best foaming surfactant in these cases foams to provide resistance to flow in the oil depleted zones, but does not foam and block access to the zones at high oil saturation levels. An example of a surfactant with these properties is provided by U.S. Pat. No. 4,556,107. In other cases, there are high permeability channels that become resaturated by oil gravity drainage or there are override zones with oil saturation levels which are higher than those found in mature steam floods. For improved steam mobility control and enhanced oil recovery in these circumstances, it is desirable to use a foaming surfactant which foams both at low oil saturation levels and at relatively high oil saturation levels. Accordingly, this invention most particularly relates to improving blocking of gas or steam permeability channels where the residual oil content of the fluid passageways is relatively high by use of surfactants which preferentially foam not only in oil-depleted passageways, but also in formations containing 15% or more residual oil. Such foaming serves to provide steam mobility control and improve oil recovery from the high permeability streaks and to divert steam into the surrounding areas to increase oil mobilization and oil recovery from the oil-rich portions of the reservoir.

In a preferred form, the foaming composition is a surfactant solution containing an alkyl aromatic surfactant (AAS) component with a branched alkyl group having at least three tertiary and/or quaternary carbon atoms. In another preferred embodiment, the solution includes a branched alkyl aromatic sulfonate component and (1) an alpha olefin sulfonate dimer component, or (2) a sodium metasilicate component, or (3) a sodium chloride component, or mixtures of (1), (2) and (3). Such compositions prepared in accordance with the present invention have been demonstrated to have superior response time and provide effective foam blocking and movement of oil through cores containing significant amounts of residual oil.

It is a particular object of this invention to inject into a petroleum-bearing formation a foam-forming surfactant composition in a water solution which substantially more effectively blocks highly permeable gas, or steam channels in the presence of substantial amounts of residual oil. Such foaming composition not only mobilizes the residual oil as it blocks the gas permeable portion of the reservoir, but effectively enhances steam or gas contact of the oil-rich, less-permeable, petroleum-bearing portions of the formation.

In qualitative terms, the new surfactant compositions include a foam-forming surfactant component selected for its high effectiveness as a foamer in the presence of gas or steam containing at least some water and residual oil. In a preferred form, the injected surfactant solution is a multiply-branched alkyl aromatic sulfonate having a high molecular weight on the order of at least 400, exhibits superior foaming and steam mobility control in high permeability channels containing water and significant amounts of residual oil. If desired for foam persistence under reservoir conditions, a non-condensable gas, such as nitrogen, carbon monoxide, methane or the like may be added to the steam before injection with the foam forming components.

BACKGROUND OF THE INVENTION

Steam stimulation of petroleum-bearing formations, or reservoirs, has become one of the preferred methods of enhanced oil recovery. This is because steam is cost-effective to supply heat to low-gravity, high viscosity oils. Heat reduces resistance of oil flow from a reservoir to a producing well over a wide range of formation permeabilities. Further, such steam injection enhances the natural reservoir pressure, above that due to the hydrostatic head, or depth-pressure gradient, to increase the differential pressure between oil in the reservoir and the producing well bore.

The producing well may be the same well through which steam is periodically injected to stimulate petroleum flow from the reservoir (popularly called "huff and puff"). Alternatively, one or more producing wells may be spaced from the injection well so that the injected steam drives petroleum through the reservoir to at least one such producing well.

Almost all earth formations forming petroleum reservoirs are created by sedimentary deposition, with subsequent compaction or crystallization of the rock matrix. Such deposition of detrital materials, with varying composition and over extensive geological times, occurs at varying rates. The resulting compacted rocks in which petroleum accumulates are permeable, but in general the flow paths are quite heterogeneous. Accordingly, a petroleum reservoir formed by such rock formations are inherently inhomogeneous as to both porosity and permeability for fluid flow of either native (connate) or injected fluids. Furthermore, flow permeability for connate gas, oil and water is substantially different for each liquid or mixture. Because of these differences in permeability, it is now common practice to inject foam forming surfactants with the injected steam to block the more permeable gas passages that may develop in the formation. The desired result is to divert steam from the more permeable gas passageway to less permeable oil-rich zones of the reservoir. The foaming component is usually an organic surfactant material Another particular feature of such inhomogeneity of sedimentary rock formations appears to be their shale or clay content It is known that such clay material is susceptible to alteration when contacted by water and particularly when the injected water is in the form of steam having little salt content. In general, clays have large surface area to volume ratios and when altered by water or steam tend to affect adversely contact between connate oil and reservoir rock. Most specifically, reservoirs containing viscous oils having organo-metallic and acidic components are particularly susceptible to both steam and surfactant materials used in enhanced oil recovery. Further, the solubility of surfactant in the connate water of the formation and the reservoir oil may have a deleterious effect on the foaming ability or stability of the foam where gas permeability and steam loss has increased by fingering or gas override. Thus, the foam may not be active where residual oil in the highly permeable channels exceeds more than a few percentage of the pore volume. Hence, there is a need for foam forming surfactant compositions which preferentially form foam in contact with residual oil within or around the steam- or water-permeable passageways of the formation, but without significant foam formation where they contact oil in oil-rich flow channels through the reservoir.

This invention is an improvement over prior methods of using foam-forming compositions to enhance petroleum production from oil-bearing formations. Many of these are mentioned and discussed in U.S. Pat. No. 4,086,964. Others include U.S. Pat. Nos. 4,393,937, 4,532,993 and 4,161,217. It is also an improvement over previously known methods of foam formation to control "fingering" or "over-ride" by injecting a foam-forming surfactant with gas or steam which primarily foams upon contact with residual oil portions of the reservoir created by gas or steam flow paths therethrough.

The need for surfactants which foam in the presence of both oil and water has been known for some time. Bernard ("Effect of Foam on Recovery of Oil by Gas Drive" Prod. Monthly 27. No. 1, 18–21, 1963) noted that the best foaming surfactants for immiscible displacements such as steam floods are those which foam when both oil and water are present. Dilgren et al. (U.S. Pat. No. 4,086,964) recognized the importance of non-condensable gas and added electrolyte such as sodium chloride for steam foams and discloses the use of an alkyl aromatic sulfonate, dodecylbenzene sulfonate, for this use. Other patents teach the use of alkyl aromatic sulfonates for this use without recognizing a difference in performance for the branched and linear structures (U.S. Pat. No. 4,532,993; 4,161,217 and 3,348,611). U.S. Pat. No. 4,161,217 teaches that mixtures of low molecular weight (300–400) and high molecular weight (400–600) alkyl aromatic sulfonates are useful foaming agents for hot water non-condensable gas foam drives. A still more recent patent (U.S. Pat. No. 4,562,727) teaches that olefin sulfonates such as alpha olefin sulfonates are substantial improvements over alkyl aromatic sulfonates. The present invention identifies a class of branched alkyl aromatic sulfonates which offer substantial advantages over the surfactants of the prior art to produce better foaming behavior in the presence of varying amounts of residual oil. They are especially useful for improving oil recovery from reservoirs with high permeability zones containing varying amounts of residual oil having pore volume saturations of from a few percent to 30% or higher.

SUMMARY OF THE INVENTION

The present invention is directed to a composition for, and an improved process of, enhancing petroleum recovery from a petroleum reservoir using steam and involves injecting into the reservoir, along with such steam, a surfactant composition which upon injection is capable of co-acting with such steam in the presence of residual or relatively depleted oil portions of the reservoir, to form a foam. Preferably the steam is at least partially wet to assist the formation of such foam in contact with residual oil.

In a preferred form, the foaming composition is a surfactant solution containing (1) a branched alkyl aromatic surfactant component with the alkyl group containing at least three tertiary and/or quaternary carbon atoms and with a molecular weight of at least 400. In a further preferred form, the composition may be a mixture of (1) in combination with (2) a second anionic surfactant component such as an alpha olefin sulfonate or alpha olefin sulfonate dimer component, or (3) an electrolyte such as sodium chloride or sodium metasilicate component, or mixtures of (1), with (2) and (3). Such compositions prepared in accordance with the present invention have been demonstrated to have a superior combination of beneficial properties including a rapid response and a strong foam in the presence of variable amounts of residual oil.

In a most preferred form, the foam forming component is an alkyl aromatic sulfonate which is preferably a multiply branched alkyl aromatic sulfonate having a molecular weight of at least 400 as described earlier, which can be injected into a producing formation, either intermittently or continuously, and either in a water solution, or as an additive to wet steam. Desirably, such branched alkyl aromatic sulfonates are capable of interacting with the injected steam to form foam primarily in the residual oil portions of the reservoir formation and either block or mobilize residual oil in such permeability channels.

In preferred forms of such multiply branched alkyl aromatic sulfonates, the branched alkyls, having from 15 to 30 carbon atoms are each attached to the aromatic component, desirably benzene, toluene, or xylene and the sulfonate component is attached to the aromatic ring. The alkyl aromatic sulfonates may be prepared from the branched alkyl aromatic component by conventional laboratory or commercial sulfonation processes. The branched alkyl aromatics can be prepared by alkylating the aromatic component with a branched olefin. The branched olefins of appropriate molecular weight may be prepared by olefin oligomerization processes such as the action of an appropriate catalyst on propylene. Examples of catalytic propylene oligomerization processes suitable for the present invention are the well known phosphoric acid or boron trifluoride catalyzed oligomerizations. U.S. Pat. No. 3,932,553 provides examples of suitable oligomerization processes.

The sulfonates are suitably in salt form, particularly salts of sodium, potassium, ammonium or other water-soluble cations. The preferred salt is sodium. However, acid forms of the sulfonates may also be used in the present invention.

Desirably, but not necessarily, the steam may include an injectable, non-condensable gas along with the surfactant composition. The non-condensable gas component may be injected continuously or at least periodically with the steam. Further, the gas may be miscible in the oil phase of the reservoir fluids. Such gas may be nitrogen, methane, flue gas, carbon dioxide, carbon monoxide or air. Further, the steam and the surfactant composition may be injected continuously into one well for producing oil from an adjacent well penetrating the same reservoir. Alternatively, the steam including the foam-forming composition may be injected cyclically into one well and petroleum periodically produced from the same well.

Further objects and advantages of the present invention will become apparent from the following detailed description taken with the drawings which form an integral part of the present specification.

DESCRIPTION OF THE INVENTION

The present invention is, at least in part, based on the discovery that non-obvious and beneficial advantages are obtained by using a composition of matter which includes using particular branched alkyl aromatic sulfonate surfactant components for foam-injection into a petroleum reservoir which are more effective in the presence of steam to foam and mobilize residual oil in gas permeable passageways than previously known surfactant compositions. The essential feature of such a composition of matter is its superior ability to foam where a substantial fraction of the flow paths contain residual oil, but substantially higher percentages of gas or steam, than other portions of a reservoir. The result of using such a composition in steam-assisted oil recovery is that the high permeability streaks in the reservoir channels which contain substantial volumes of residual oil are effectively plugged preferentially by the foam. Thus, residual oil is effectively mobilized and moved through the channels. Such preferential foam plugging diverts steam or gas flow through the formation to less permeable zones containing substantially higher oil concentrations. Accordingly, it will be noted that the present process has the beneficial effects of enhancing recovery of petroleum from petroleum reservoirs, by more rapidly forming foam in the presence of substantial amounts of residual oil to divert steam or gas from the more gas permeable, relatively oil-depleted zones, so that lesser volumes of gas increase oil flow from petroleum-rich, but less permeable, zones of the reservoir.

Figure 1:
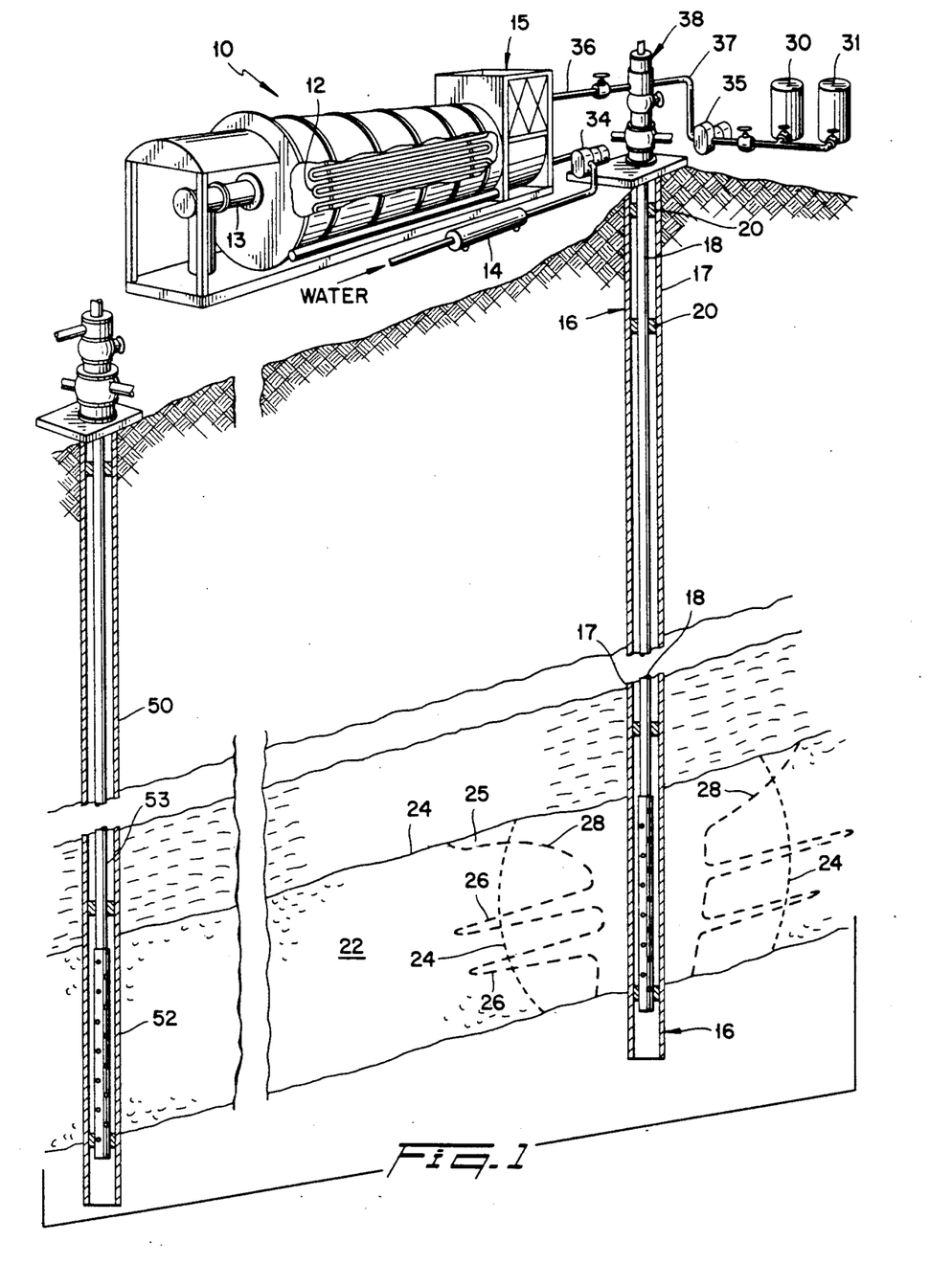
FIG. 1 is a schematic elevational representation of an injection well penetrating a petroleum reservoir formed by a sedimentary earth formation wherein steam is injected to reduce viscosity of the oil and a surfactant composition including the foam-forming component.

FIG. 1 illustrates schematically an arrangement for injecting the foam-forming surfactant composition of the present invention into an at least partially depleted oil reservoir where it is desirable to reduce the steam or gas permeability. As indicated, the invention is particularly directed to the problem of controlling steam injection into a producing formation to heat the petroleum and thereby reduce its viscosity. The steam may also increase pressure in the formation to enhance the natural gas or stratigraphic pressures to increase petroleum flow into the same well, or an adjacent well, penetrating the formation. For this purpose a steam generator 10 typically generates steam from water in a single-pass through a continuous boiler tube 12 heated by a gas or oil-fired burner 13. Water for steam generation is supplied by pump 34 and typically it will include minerals and salts which replicate or, are compatible with, connate water in the formation. Desirably, water may pass through a "water-softener", or ion exchange medium 14, and is heated in boiler tubes 12 sufficiently to form a low quality or "wet" steam, preferably having a quality of less than 80%. Such steam is injected into well 16 through well head 38 by steam pipe 36 out of heat exchanger 15. Steam is then injected into a pipe string 18 running down well casing 17. Pipe string 18 may be spaced as by centralizers 20 from casing 17 to prevent loss of heat from the steam to earth formations along the length of casing 17 to the desired injection depth, such as earth formation 24 forming reservoir 22.

The permeability of nearly all sedimentary earth formations which form petroleum reservoirs, such as 22, are inherently inhomogeneous to flow of connate fluids, water, oil and gas. Each of these fluids tends to flow selectively in permeability channels that have the least resistance to such flow. The resistance to flow of each fluid primarily depends upon its viscosity either alone or in mixed phase with the other fluids. Typically, the resulting or relative permeability of the flow paths for each fluid is different within each formation. Since gases are more mobile than either oil or water, or their mixtures, injected steam in general tends to flow through more permeable gas channels and may form "fingers" 26 in formation 22 as indicated by dotted lines. This gas flow by-passes "tighter" or less permeably zones wherein the oil-permeable passages are smaller or the oil is more tightly bound to the surface of the rock. In particular, the oil may also be in contact with clay or shale material with sand or carbonate components that form the permeable channels. Thus, "fingering" develops as indicated by channels 26, or "gas override" occurs as indicated by area 25 at the top of formation 22. Where these develop, energy is lost and large portions of the liquid oil are not heated by the injected steam. With steam flow predominantly lower permeability gas channels 25 and 26, the injection profile is distorted, as indicated generally by dotted line 28.

As discussed above, distortion of the injection profile may be corrected by addition of a foam-forming component to steam injection line 36. For this purpose, surfactant solution is supplied by tanks 30 and 31 through metering pump 35 and injection line 37. Foam may be created within the formation either by forming it with gas or steam within the steam supply line or upon contact with formation fluids. The foam so injected preferentially flows with the steam to gas-permeable channels 25, 26. It effectively plugs them temporarily so that steam in the formation is then diverted to heat the oil-rich portions of the formation. The desired result is indicated by the relatively piston-like movement of the steam front indicated by dotted lines 24.

However, a particular difficulty is forming and maintaining foam as a blocking agent in those steam or gas permeable channels arises where they contain substantial or significant amounts of residual oil, that is, in excess of a few percent. In particular, it has been found that previously known surfactants are not effective in reservoirs having a residual oil content of more than a few percent. In accordance with the present invention, I have found that the branched alkyl aromatic sulfonates are remarkably effective in forming foam in the presence of significantly higher percentages of such residual oil, say up to 30% or higher of the available pore volume.

In the present illustration, oil is produced from an adjacent producing well, such as 50, by a pump 52. It will also be understood that formation 22 may be cyclically heated by steam, and then periodically oil produced from injection well 16 through pipe 18 by rearranging well head 38 so that it supports a pumping unit similar to pump 52 on well string 53 in well 50.

The surfactant composition prepared in accordance with the present invention, is preferably supplied as a liquid solution and pumped as a foam forming concentrate from tank 30 for mixing with reservoir compatible water from tank 31. The solution is metered by pump 35 through line 37 at a desired rate to contact steam flowing in line 36 or pipe 18. Alternatively, the foam may be formed with gas from a gas source (not shown). Suitable gases may include nitrogen, flue gas, methane, carbon dioxide, carbon monoxide or air. Such gas would be added through well head 38 as by line 36.

Figure 2:
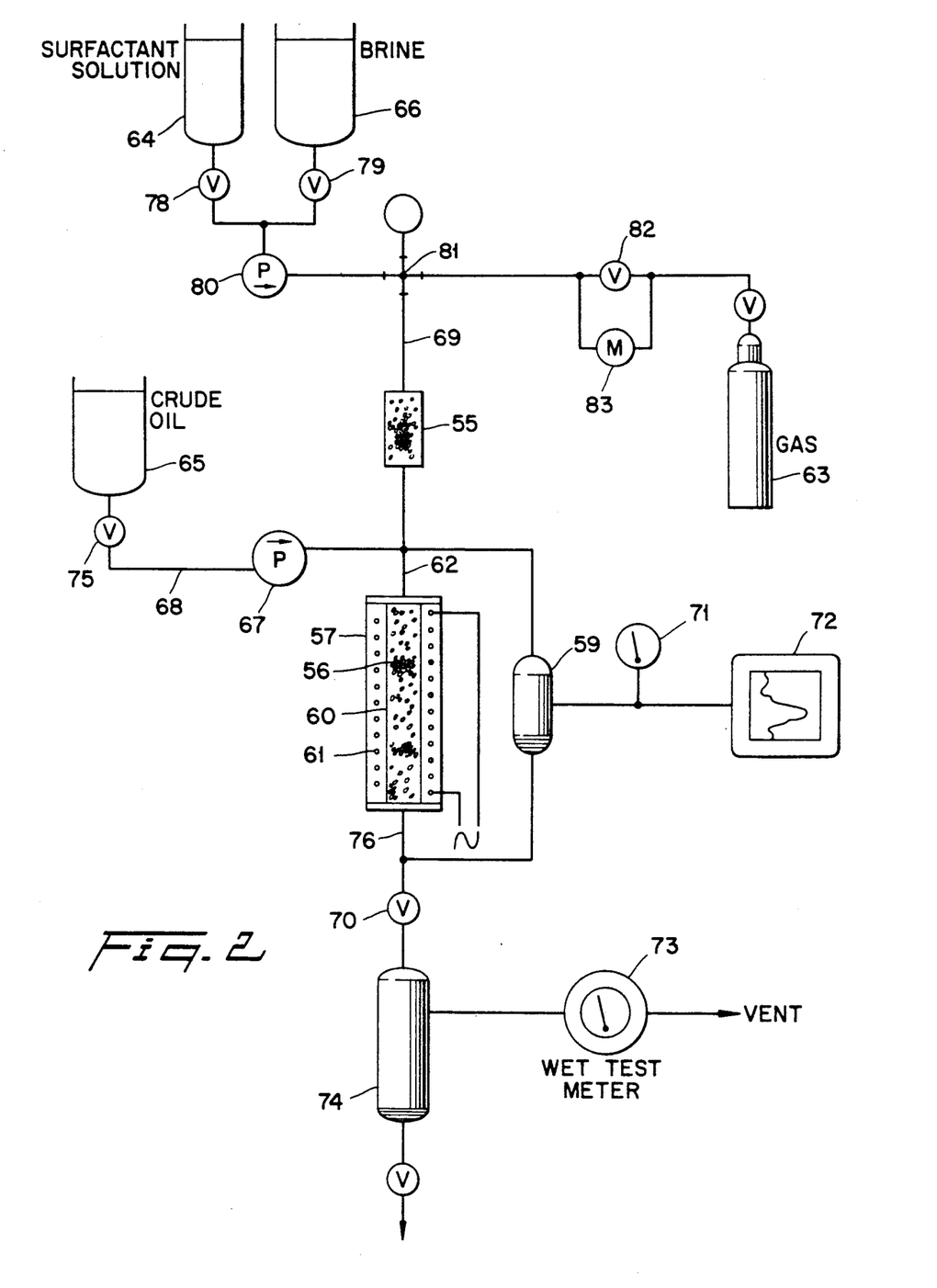
FIG. 2 is a schematic flow diagram of a test arrangement for generating foam in the presence of oil and water representative of connate fluids in a reservoir in which foam is formed for flow through a permeable core so that a surfactant forming such foam may be evaluated as to its usefulness to block steam permeable paths through oil-depleted or residual oil in a flooded-out core and to measure its resistance to foaming under varying liquid conditions in the core.
Figure 3:
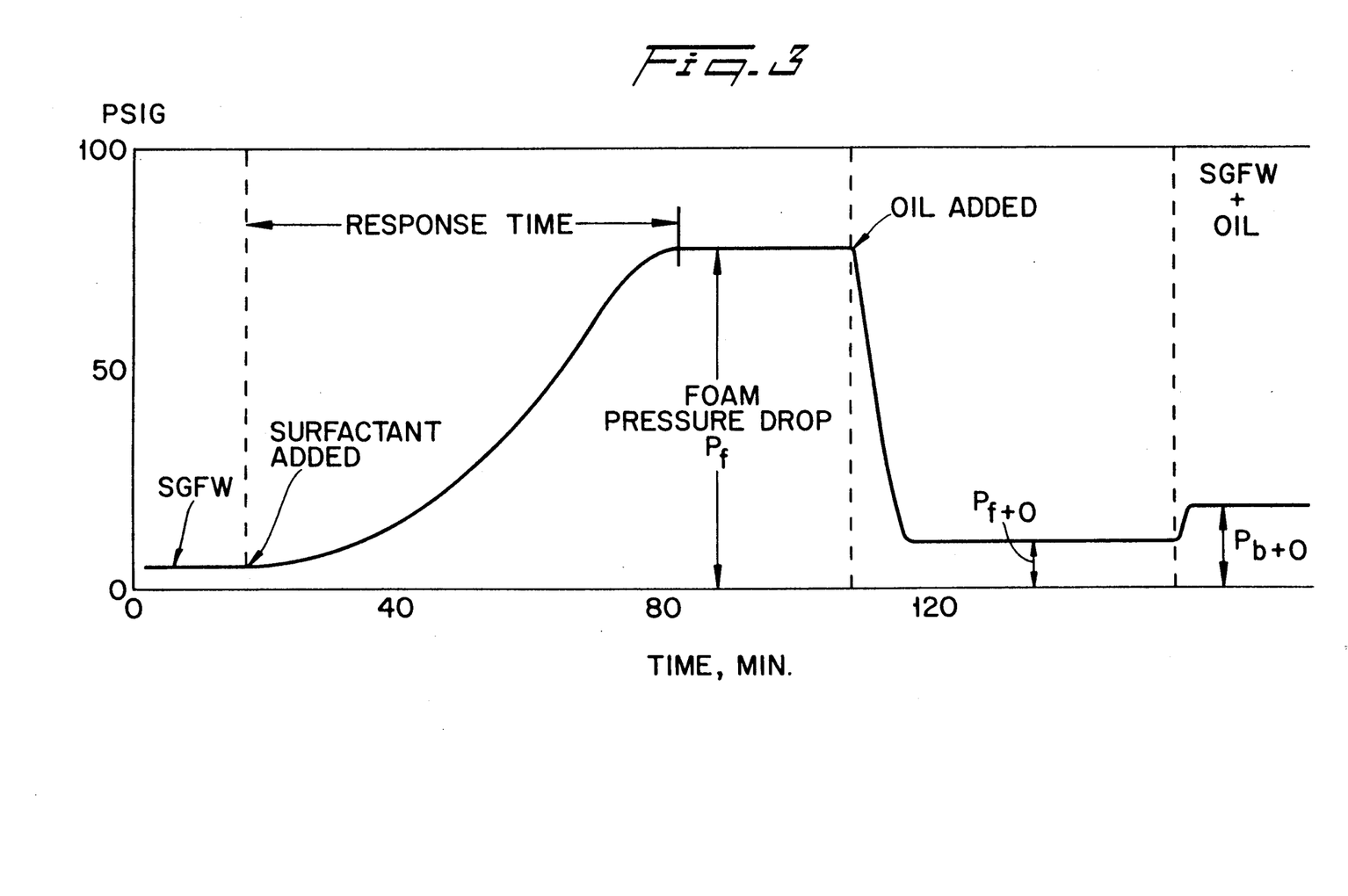
FIG. 3 is a graph of test results obtained with the test arrangement of FIG. 2 and illustrates a portion of a method of evaluating surfactant compositions as to their foam-forming capability and stability in the presence of residual oil and brine in the core.

FIG. 2 schematically illustrates test apparatus suitable for evaluating steam foam surfactant compositions and the compatibility of their foaming components in cores containing varying amounts of residual oil, to evaluate their effectiveness to form and maintain foams to block steam or gas flow. In this embodiment, the permeable oil-bearing reservoir rock sample or core is simulated by a steel wool pack 60. Such a core is disposed in an autoclave or visual pressure container 57 suitable for holding the core at reservoir temperatures, as by heater coil 61, and pressures. Heat may be added to the incoming fluids by preheater 55. Pressure may be applied by gas source 63, such as nitrogen. Temperatures on the order of 300° F. to 500° F. and pressures up to 1000 psi are provided. Fluids are then selectively supplied to the core under suitable flow conditions. The apparatus provides a source of steam generator feed water (SGFW) from Brine tank 66 under control of valve 79. Crude Oil from tank 65 is supplied through valve 75 and line 68 to pump 67. Inert Gas such as nitrogen from tank 63, creates flow through test core 60 under control of valve 82, as measured by flow meter 83. As indicated, these sources simulate reservoir brine and crude oil of a subject reservoir. The oil and brine act as displacing fluids. Selected surfactant solutions from tank 64 are added to brine from tank 66 and the mixture is supplied to the core through preheater 55 under pressure by pump 80. The surfactant materials from 64 may be introduced into the test system in selected quantities by valve 78. Differential pressure across core 60 is measured by DP cell 59 connected across inlet line 62 and outlet line 76. The detected pressure difference is desirably recorded as a time-pressure graph, as shown in FIG. 3, by recorder 72. Inert gas volumes are measured by wet test meter 73 connected to separator tank 74.

Steam-Foam Test

The steam-foam test consists of recording the pressure drop vs time, as detected by differential pressure cell 59. A selected foaming surfactant flows through steel wool plug 60 in cell 57 and suitably run at 400° F. and 500 psig in the presence of flowing nitrogen.

A typical test sequence is illustrated in FIG. 3. The first step is to pass Steam Generator Feed Water (SGFW) from brine source 66 and oil, such as a representative crude from tank 65, together through core 60 until a substantially constant pressure drop vs time is recorded. As shown in FIG. 3, this is followed by flowing SGFW alone until steady state is again established. This puts the foam generator in a "Residual Oil" state. Pressure drop under these conditions is typically 0–2 psi.

Next, a surfactant composition from tank 64 which is to be tested is pumped through the system as a dilute solution in SGFW. With a good foaming composition, the pressure across the steel wool pack 60 increases over 15–100 min and levels off at a new steady state value (typically 20–100 psi); this condition is indicated in the section of the graph of FIG. 3 identified as foam pressure drop ($P_f$). The test then continues with introduction of oil along with surfactant composition. The measured pressure drop under these conditions is typically 2–20 psi ($P_{f+o}$). Finally, the surfactant solution is replaced with brine (SGFW) alone and the pressure drop with brine and residual oil is measured ($P_{b+o}$). Four performance parameters are measured (1) The time required to reach a steady state pressure drop with foam (Response Time), (2) the steady-state pressure drop with the foam ($P_f$), (3) the steady-state pressure drop with foam+oil ($P_{f+o}$), and (4) the steady-state pressure drop with brine (SGFW)+oil ($P_{b+o}$). These performance parameters are labeled in FIG. 3. Large values for $P_f$ (FIG. 3) and low values for $P_{f+o}$ (FIG. 3) are desired where residual oil saturation is low. Surfactant compositions with these properties are able to increase the resistance to steam flow in high permeability zones of the reservoir where residual oil saturation is low; thus steam is redirected to portions of the reservoir where oil content is still high. This is typical of gravity override or steam channeling situations as shown in FIG. 1.

The Response Time and foam pressure ($P_f$) in FIG. 3 depend upon the surfactant and the residual oil in the foam (core) generator. In the absence of residual oil, the response time is very short with a pressure increase occurring as soon as the foaming surfactant contacts the foam generator. When residual oil is present, Response Time and $P_f$ depend upon how effectively the surfactant mobilizes and removes oil and how well the surfactant foams in the presence of oil. Foaming surfactants of the prior art which have been used in steam flooding to counteract override conditions with low residual oil behave as shown in FIG. 3; the pressure drop with foam+oil ($P_{f+o}$) is much lower than the pressure drop with foam alone ($P_f$) and either lower or about the same as the pressure drop with brine+oil ($P_{b+o}$), indicating the absence of foaming in the presence of oil. For circumstances where there are high permeability channels which contain oil from gravity drainage or there are override zones with oil saturation levels which are higher than those found in mature steam floods, the preferred performance is a rapid response with residual oil (short Response Time in FIG. 3), a high pressure drop with foam ($P_f$), and a substantial pressure drop with foam plus low levels of flowing oil (high $P_{f+o}$).

Surprisingly, we have found a class of surfactants which have the favorable combination of properties including a rapid response rate with residual oil, a high pressure drop with foam ($P_f$), and a pressure drop with foam+oil ($P_{f+o}$) which is higher than the pressure drop with brine+oil ($P_{b+o}$). These surfactants offer the advantages of providing steam diversion and steam mobility control in override conditions and low residual oil saturation zones as well as in high permeability channels containing high residual oil levels. The following examples demonstrate these properties.

The characteristics of the foam generator used in the above-described Steam-Foam test may change with time as the steel wool pack ages, or it is replaced. This may result in constantly changing values for the parameters measured in this test and make it difficult to compare absolute values of one surfactant to another. For this reason, a standard composition known to perform well is run in the test unit on a given day and results for all other surfactants tested on the same day and the same pack are recorded relative to this reference material. Reproducibility of relative Foam Blocking and Response Time measurements are generally within 10%.

EXAMPLES

The surfactants were compared in the foam test unit described above and depicted in FIG. 3. The foam flow tests were run in a ½ inch diameter by 2½ inch long steel wool foam generator at 400° F. and about 500 psi. The surfactants were tested at a liquid phase flow rate of 2 ml/min. with an active component concentration of about 0.5% by weight. The gas phase consisted of approximately equal volumes of steam and nitrogen at a combined approximate flow rate of 40 ml/min. at test conditions. The tests with flowing oil were run with 2 ml/min. surfactant solution or SGFW and 0.2 ml/min. of Kern River crude oil. The brine, or synthetic SGFW, was prepared by dissolving NaCl (295 mg/l), KCl (11 mg/l), $NaHCO_3$ (334 mg/l), and $Na_2SO_4$ (61 mg/l) in distilled water. The following abbreviations are used in the examples:

| | |
|---|---|
| LABS | Linear Alkyl Benzene Sulfonate |
| LATS | Linear Alkyl Toluene Sulfonate |
| LAXS | Linear Alkyl Xylene Sulfonate |
| BABS | Branched Alkyl Benzene Sulfonate |
| BATS | Branched Alkyl Toluene Sulfonate |
| BAXS | Branched Alkyl Xylene Sulfonate |
| BACS | Branched Alkyl Cumene Sulfonate |

EXAMPLE 1

This example compares the performance of representative surfactants of the present invention with surfactants which have been used or considered for use in the field for steam-foam floods. In the Table I, relative values are given for the response rate and foam pressure ($P_f$) whereas the absolute value for the $P_{f+o}/P_{b+o}$ is given. The reciprocal of the response times of FIG. 3 were used to obtain the relative response rates.

TABLE I

| | Relative Values | | |
|---|---|---|---|
| Surfactant | Response Rate | $P_f$ | $P_{f+o}/P_{b+o}$ |
| Suntech TM IV 1015 | 1 | 1 | 0.1 |
| Chaser TM SD1000 | 2 | 1 | 0.1 |
| Enordet TM 1618AOS | 0.7 | 0.5 | 0.4 |
| Enordet TM LXS 1314 | 1 | 0.1 | 0.2 |
| Enordet TM LTS 18 | 6 | 1 | 0.2 |
| COR TM 180 | 0.3 | 0.6 | 0.7 |
| Dowfax TM 2A1 | 0.5 | 0.5 | 1 |
| Dowfax TM 3B2 | 1.8 | 0.5 | 0.6 |
| BATS (457)[1] | 6 | 0.9 | 8.5 |
| BAXS (470)[1] | 8 | 1 | 4.3 |
| BABS (504)[1] | 4 | 1.3 | 3.1 |

[1] Average Values for the Equivalent Weights

These results show that the branched alkyl aromatic sulfonate of the present invention have the best combination of the desired properties in each of the three values; fast response (substantially higher than 1), high foam pressure ($P_f$) (about 1), and a high value for the ratio of the pressure of foam+oil ($P_{f+o}$) to the pressure of brine+oil ($P_{b+o}$) (substantially greater than 1).

EXAMPLE 2

Tests were run as in Example 1. These results show that the branched alkyl aromatic sulfonates of the present invention have better combinations of the desired properties than the linear alkyl aromatic sulfonates or lower equivalent weight branched alkyl aromatic sulfonates.

TABLE II

| | | Relative Values | | |
|---|---|---|---|---|
| Surfactant | EW* | No. of side* Chain carbons | Response Rate | $P_f$ | $P_{f+o}/P_{b+o}$ |
| LABS | 347 | 12 | 0 | 0 | — |
| BABS | 361 | 13 | 0 | 0 | — |
| BACS | 385 | 12 | 0 | 0 | — |
| LAXS | 389 | 13 | 0.5 | 0.1 | 0.5 |
| LATS | 424 | 16 | 0.5 | 1 | 0.1 |
| LATS | 457 | 19 | 3 | 1 | 0.2 |
| BATS | 457 | 19 | 3 | 0.9 | 8.5 |
| BAXS | 470 | 19 | 4 | 1 | 4.3 |
| BATS | 471 | 20 | 7 | 1 | 1.2 |
| BABS | 504 | 23 | 4 | 1.2 | 5 |
| BATS | 521 | 23 | 3 | 0.7 | 1.2 |
| BATS | 550 | 25 | 3 | 1.3 | 13 |

*Average values are given for the equivalent weights (EW) and the number of carbons in the side chain.

EXAMPLE 3

Tests were run as in Example 1. In these cases an additive, either an electrolyte or an anionic surfactant, was included with the primary surfactant.

TABLE III

| | | | Relative Values | | |
|---|---|---|---|---|---|
| Surfactant | EW | Additive | Response Rate | $P_f$ | $P_{f+o}/P_{b+o}$ |
| BATS | 425 | 1% NaCl | 5.4 | 0.9 | 18[4] |
| BATS | 425 | 0.5% $Na_2SO_4$ | 2.7 | 0.9 | 2.7 |
| BATS | 425 | 0.5% SMS[1] | 4.4 | 0.9 | 2.9 |
| BATS | 471 | 0.5% NaCl | 7 | 0.9 | 1.6 |
| BABS | 504 | 0.5% NaCl | 6 | 1.1 | 5[4] |
| BATS (0.25%)[3] | 457 | AOSD[2] (0.25%) | 3.8 | 0.9 | 1.4 |
| BATS (0.25%)[3] | 521 | AOSD[2] (0.25%) | 3 | 1 | 2.4 |
| BATS (0.25%)[3] | 521 | 2024AOS (0.25%) | 3.8 | 1 | 1.5 |
| LATS (0.25%)[3] | 457 | AOSD[2] | 0.8 | 0.8 | 1 |

TABLE III-continued

| | | Relative Values | | | |
|---|---|---|---|---|---|
| Surfactant | EW | Additive | Response Rate | $P_f$ | $P_{f+o}/P_{b+o}$ |
| | | (0.25%) | | | |

[1] SMS is sodium metasilicate
[2] AOSD is an alpha olefin dimer surfactant described in U.S. 4,556,107.
[3] In these cases, each surfactant component was present to the extent of 0.25% by weight. In all other cases, the single surfactant component was present at 0.5% by weight.
[4] Pressure pulses observed with foam + oil.

The results of Example 3 demonstrate that the branched alkyl aromatic sulfonates of the present invention respond rapidly, give high foam pressures ($P_f$), and give high $P_{f+o}/P_{b+o}$ ratios in the presence of electrolytes or other anionic surfactants. Note that the LATS/AOSD mixture (last entry above) which lies outside of the present invention, did not give high values for all three of the desired properties.

Preferably the sulfonate component is in the form of a sodium salt. Other salts such as potassium, ammonium or other water-soluble cations and mixtures thereof may be used. Additionally, the sulfonates may be in acid form in the branched alkyl aromatic sulfonates useful in the practice of our invention.

Various modifications and changes in the surfactant compositions and their method of use to enhance recovery of oil from reservoirs undergoing steam stimulation will become apparent to those skilled in the art from the forgoing description of examples and their use. All such modifications or changes coming within the spirit and scope of the present invention are intended to be included within the scope of the claims defining the invention.

We claim:

1. A method of enhanced recovery of oil from a petroleum reservoir during gas injection into said reservoir which comprises:
   periodically injecting gas comprising steam and a solution of an anionic surfactant into said reservoir from a known depth interval in a well to form a foam in the presence of residual oil in high gas permeable channels of said reservoir, said anionic surfactant solution including an effective amount of an alkyl aromatic sulfonate component which has an average molecular weight of from 400 to 600 and at least one of the alkyl groups has a carbon content of from 15 to 30 carbon atoms and said alkyl group is branched with at least three tertiary or quaternary carbon atoms;
   contacting the reservoir fluids in said formation with the resulting foam and said gas away from said injection interval to assist movement of said reservoir fluids toward a producing interval in said reservoir; and
   recovering oil from said producing interval.

2. A method in accordance with claim 1 wherein said gas is steam and said alkyl aromatic sulfonate is from about 0.01% to 5% of the water phase of said steam.

3. A method in accordance with claim 2 wherein the gaseous phase of said steam includes a non-condensable gas from about 1% to 50%.

4. A method in accordance with claim 3 wherein said gas includes nitrogen, methane, flue gas, carbon dioxide, carbon monoxide, or air.

5. A method in accordance with claim 1 wherein said gas includes nitrogen, methane, flue gas, carbon dioxide, carbon monoxide, or air.

6. A method in accordance with claim 1 wherein the aromatic component of said alkyl aromatic sulfonate is benzene.

7. A method in accordance with claim 1 wherein the aromatic component of said alkyl aromatic sulfonate is toluene.

8. A method in accordance with claim 1 wherein the aromatic component of said alkyl aromatic sulfonate is xylene.

9. A method in accordance with claim 1 wherein the sulfonate component of said alkyl aromatic sulfonate is in a water-soluble salt form selected from the group including sodium, potassium and ammonium salts.

10. The method of claim 9 wherein the water soluble salt of said sulfonate component is sodium.

11. The method of claim 1 wherein the sulfonate component of said alkyl aromatic sulfonate is in the acid form.

12. A method in accordance with claim 1 wherein said solution additionally includes one or more components selected from the group consisting of an alpha olefin sulfonate component, a sodium metasylicate component, and a sodium chloride component.

13. A method in accordance with claim 1 wherein said aromatic component contains 0-2 normal alkyl substituents with 0-3 carbon atoms in addition to said alkyl group.

14. A method in accordance with claim 2 wherein said water phase of said steam additionally contains 0.01% to 5% of an electrolyte.

15. A method in accordance with claim 2 wherein said water phase contains 0.1% to 5% of an added anionic surfactant of different structure.

16. A method in accordance with claim 15 wherein said added anionic surfactant is one or more components selected from the group consisting of an alpha olefin sulfonate, an alpha olefin sulfonate dimer, and a linear alkyl aromatic sulfonate.

17. A method in accordance with claim 1 wherein the injection depth interval and the producing interval are in the same well.

18. A process for recovering hydrocarbons from a subterranean hydrocarbon bearing formation penetrated by at least one injection well and at least one production well, said process comprising:
   forming a steam and alkyl aromatic sulfonate foam, said alkyl aromatic sulfonate having an average molecular weight of 400 to 600 and including at least one alkyl group having a carbon content of from 15 to 30 carbon atoms, said alkyl group being branched with at least three tertiary or quaternary carbon atoms;
   passing said steam and alkyl aromatic sulfonate foam into said formation and away from said injected well to assist the movement of hydrocarbons toward a production well; and
   recovering hydrocarbons at said production well.

19. A process in accordance with claim 18 wherein the alkyl aromatic sulfonate comprises from about 0.01% to about 5% of the water phase of the steam.

20. A process in accordance with claim 19 wherein a non-condensable gas in an amount from about 0.1% to about 50% of the gaseous phase of said steam is injected with the steam into the injection well.

21. A process in accordance with claim 20 wherein the non-condensable gas is selected from one or more of the group consisting of nitrogen, methane, flue gas, carbon dioxide, carbon monoxide, and air.

22. A process in accordance with claim 18 wherein the aromatic component of the alkyl aromatic sulfonate is benzene.

23. A process in accordance with claim 18 wherein the aromatic component of the alkyl aromatic sulfonate is toluene.

24. A process in accordance with claim 18 wherein the aromatic component of the alkyl aromatic sulfonate is xylene.

25. A process in accordance with claim 18 wherein the sulfonate component of said alkyl aromatic sulfonate is in a water-soluble salt form selected from the group including sodium, potassium and ammonium.

26. The process of claim 18 wherein the water soluble salt of said sulfonate component is sodium.

27. The process of claim 18 wherein the sulfonate component of said alkyl aromatic sulfonate is in the acid form.

28. A process in accordance with claim 18 wherein the sulfonate component of the alkyl aromatic sulfonate is a water-soluble salt form selected from the group including sodium, potassium and ammonium cations or mixtures thereof.

29. A process in accordance with claim 18 wherein the aromatic component of the alkyl aromatic sulfonate contains 0–2 normal alkyl substituents with 0–3 carbon atoms in addition to the said alkyl group.

30. A process in accordance with claim 18 wherein the water phase of the steam contains 0.01% to 5% of electrolyte.

31. A process in accordance with claim 18 wherein the water phase contains 0.1% to 5% of an added anionic surfactant of different structure.

32. A process in accordance with claim 31 wherein the added anionic surfactant is an alpha olefin sulfonate, an alpha olefin sulfonate dimer, or a linear alkyl aromatic sulfonate.

33. A method of enhanced recovery of oil from a petroleum reservoir during injection of a gas comprising steam into said reservoir which comprises periodically injecting a water solution from an injection well into said reservoir to form a foam with said gas in the presence of residual oil in said reservoir said water solution including an anionic surfactant having an alkyl aromatic sulfonate component wherein the alkyl group has from 15 to 30 carbon atoms and is branched with at least three tertiary or quaternary carbon atoms and an alpha olefin sulfonate dimer component, said components being in a ratio of from 1:10 to 10:1 by weight and the concentration of said components in said solution being from 0.1% to 10% by weight.

34. A method of enhanced recovery of oil from a petroleum reservoir during injection of a gas comprising steam into said reservoir which comprises periodically injecting a water solution and a gas from an injection well into said reservoir to form a foam in the presence of residual oil in said reservoir, said water solution including an anionic surfactant having an alkyl aromatic sulfonate component wherein the alkyl group has from 15 to 30 carbon atoms and is branched with at least three tertiary or quaternary carbon atoms and a sodium metasilicate component said components being in a ratio of from 1:10 to 10:1 by weight and the concentration of said components in said solution being from 0.1% to 10% by weight.

* * * * *